United States Patent [19]
Jenkins

[11] 3,876,674
[45] Apr. 8, 1975

[54] TRAILER HITCH ADAPTER FOR PICKUP TRUCKS

[75] Inventor: Otto L. Jenkins, Union Lake, Mich.

[73] Assignee: Smitty's Easy Tow, Union Lake, Mich.

[22] Filed: Oct. 9, 1973

[21] Appl. No.: 404,164

[52] U.S. Cl............................................ 280/415 B
[51] Int. Cl......................................... B62d 53/06
[58] Field of Search .......... 280/415, 423, 489, 482

[56] References Cited
UNITED STATES PATENTS

| | | | |
|---|---|---|---|
| 2,628,106 | 2/1953 | Sturwold | 280/423 B |
| 2,635,892 | 4/1953 | Shutter | 280/489 |
| 2,711,908 | 6/1955 | Saxon | 280/489 X |
| 3,164,399 | 1/1965 | Lugash | 280/415 A |
| 3,390,896 | 7/1968 | Philapy | 280/423 R |
| 3,527,476 | 9/1970 | Winckler | 280/423 R |
| 3,645,560 | 2/1972 | Steele | 280/482 |
| 3,698,740 | 10/1972 | Chisholm | 280/423 B X |
| 3,796,443 | 3/1974 | Crutchfield | 280/512 X |
| 3,796,444 | 3/1974 | Hixon | 280/423 R X |
| 3,810,661 | 5/1974 | Lowrance | 280/423 R X |

*Primary Examiner*—David Schonberg
*Assistant Examiner*—R. Schrecengost
*Attorney, Agent, or Firm*—Harness, Dickey & Pierce

[57] ABSTRACT

An adapter for permitting conventional recreational trailers to be connected to pickup trucks by a pivot over the rear axle while still permitting the truck body space to be used. The adapter comprises a truck unit mounted on the body and carrying a ball hitch, and a Z-shaped connecting unit secured at its lower end to the conventional V-shaped trailer tongue and at its upper end to the ball hitch.

8 Claims, 4 Drawing Figures

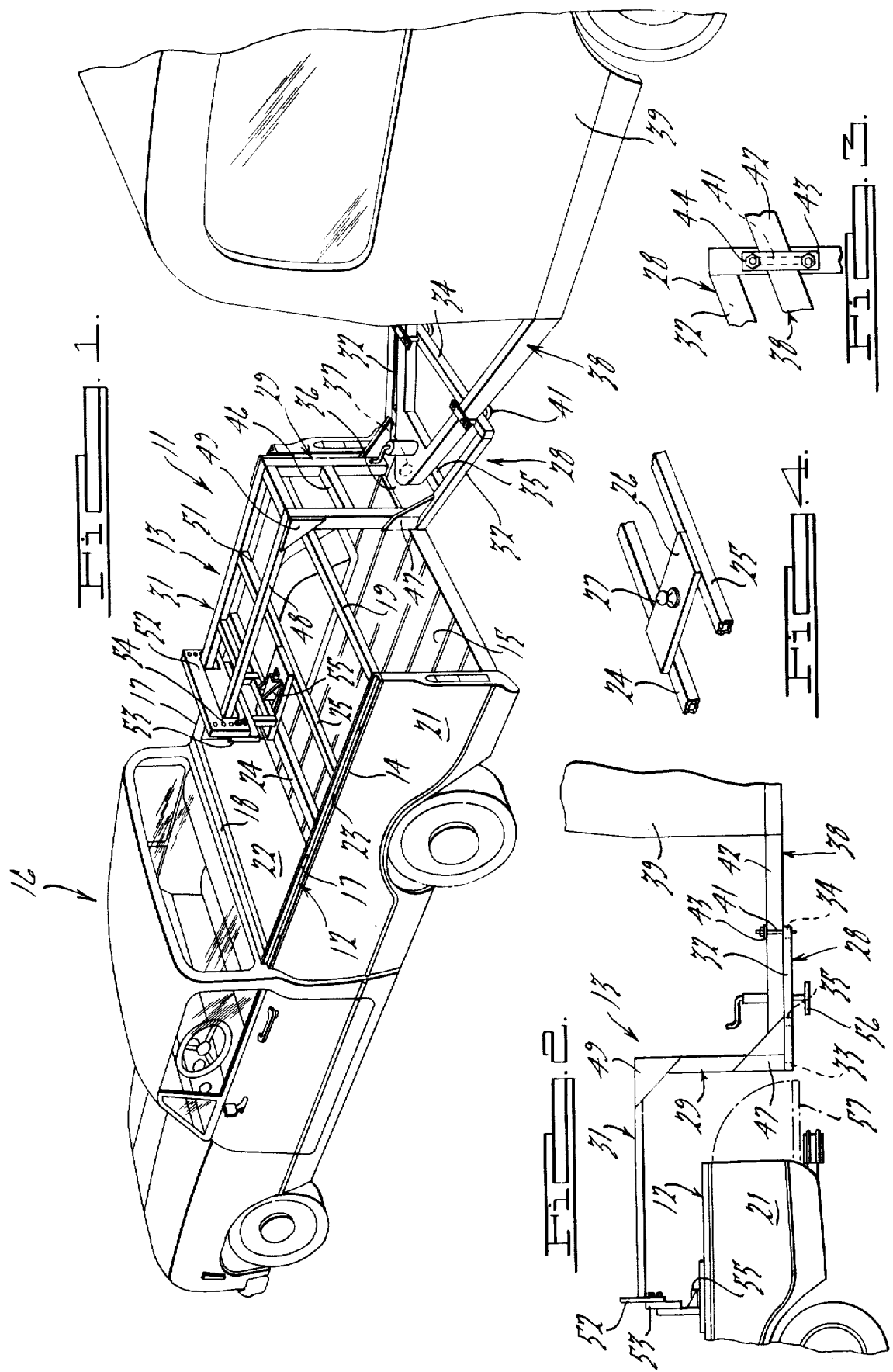

TRAILER HITCH ADAPTER FOR PICKUP TRUCKS

BACKGROUND OF THE INVENTION

1. Field of the Invention

This invention relates to trailer hitches and more particularly to means for connecting conventional recreational trailers to pickup trucks.

2. Description of the Prior Art

The conventional recreational trailer has an oblong body with a V-shaped frame extension (tongue) carrying a socket. This is normally connected to a tractor vehicle such as a car or pickup truck by attaching the socket to a ball extending rearwardly from the rear end of the tractor vehicle.

This conventional arrangement creates a downward weight on the rear of the vehicle and is subject to side-to-side sway, making it more difficult to drive. Moreover, it is hard to maneuver the trailer when backing up.

Specially shaped trailers have a bedroom extension over the body of a pickup truck pivoted above the rear axle. This type of "fifth wheel" connection obviates the disadvantages of the normal connection but, of course, necessitates the specially shaped trailer.

A novelty search on the subject matter of this invention revealed the following patents:

| Lugash | 3,164,399 |
| Dale | 3,336,050 |
| Philapy | 3,390,896 |
| Baker et al | 3,392,992 |
| Winckler | 3,527,476 |
| Chisholm et al | 3,698,740 |
| Randle | 3,703,301 |

However, these prior constructions have certain disadvantages as compared with the present invention which will become apparent from the following description.

BRIEF SUMMARY OF THE INVENTION

It is an object of the present invention to provide a novel and improved adapter which permits the owner of a conventional oblong recreational trailer to hitch the trailer to a pickup truck by a "fifth wheel" connection, that is, a pivot over the rear axle, and will nevertheless permit full use of the volume of the truck body.

It is another object to provide an improved adapter of this type which is relatively inexpensive and convenient to attach to the trailer and pickup truck, and requires no special construction of the trailer itself.

Briefly, the illustrated embodiment of the invention comprises a truck unit mountable on the truck body and carrying a ball hitch element above the rear axle, a connecting unit having lower and upper horizontal sections connected by a vertical section, means rigidly securing the lower section to the conventional V-shaped trailer tongue, and a socket hitch element carried by the upper horizontal section and connectable to said ball hitch element.

DESCRIPTION OF THE DRAWINGS

FIG. 1 is a perspective view of a pickup truck and front portion of a trailer showing the adapter of this invention attached thereto, the truck tailgate and rear bumper being removed for purposes of clarity;

FIG. 2 is a fragmentary side elevational view of the truck and trailer showing the adapter;

FIG. 3 is a fragmentary top plan view showing one of the U-shaped bolts securing the lower section of the connecting unit to the trailer tongue; and FIG. 4 is a fragmentary perspective view showing the ball hitch element carried by the truck unit.

DESCRIPTION OF THE PREFERRED EMBODIMENT

The adapter is generally indicated at 11 and comprises a truck unit generally indicated at 12 and a connecting unit generally indicated at 13. Truck unit 12 is in the form of a rectangular frame securable to the upper edge 14 of the body 15 on a pickup truck generally indicated at 16. Frame 12 has a pair of longitudinal members 17 and front and rear cross members 18 and 19 respectively. Members 17 rest on edges 14 of body side walls 21, member 18 resting on the upper edge of front wall 22 and member 19 extending between the rear ends of side walls 21. These frame members are secured to the body by any appropriate fastening means 23, or could be mounted in the stake receiving sockets conventionally found on pickup trucks.

A pair of spaced parallel intermediate cross members 24 and 25 extend between frame members 17 and support a plate 26 (FIG. 3) carrying a ball hitch element 27 above the level of truck body 15. This element is approximately above the rear axle of truck 16.

Connecting unit 13 comprises a horizontal lower section generally indicated at 28, a vertical intermediate section generally indicated at 29 extending upwardly from the forward end of section 28, and a horizontal upper section generally indicated at 31 extending forwardly from the upper end of section 29. Lower section 28 comprises a pair of longitudinal frame members 32 and front and rear cross members 33 and 34. Member 33 is somewhat shorter than member 34, with members 32 being closer at their forward ends. An intermediate cross member 35 extends between members 32 and supports a plate 36 on which is mounted a ball 37. This ball is adapted to enter into the conventional socket carried by the V-shaped tongue 38 of a recreational trailer 39.

Member 34 of connecting unit section 28 is disposed below tongue 38 and a pair of U-bolts 41 are provided for securing member 34 to bars 42 of tongue 38 (FIG. 2). These bolts pass through apertured portions of member 34 and embrace member 42, being secured by plates 43 and nuts 44. Bolts 41 plus the fastening of the tongue socket to ball 37 will serve to rigidly secure connecting unit 13 to the tongue.

Vertical section 29 of connecting unit 13 has a pair of longitudinal members 45 and cross members 46. A pair of triangular gusset plates 47 secure the edges of plate 36 to members 45. The height of section 29 is such that upper horizontal section 31 will be above the level of truck unit 12 when the connecting unit is attached to the trailer tongue and the trailer is in its normal towed position.

Upper horizontal section 31 of the connecting unit has a pair of longitudinal members 48 connected to members 45 by triangular gusset plates 49, and a plurality of cross members 51. The forward ends of members 48 carry a vertical plate 52 which in turn carries a plate 53. The latter plate is adjustable with respect to plate 52 by fasteners insertable in vertically spaced apertures 54 in plate 52. The vertical adjustment afforded by apertures 54 permits the invention to be used for different sizes of pickup trucks. The lower end of plate 53 carries a socket 55 adapted to receive ball 27 of frame unit 12.

In use of the trailer hitch adapter, frame unit 12 will be secured to pickup truck 16 and connecting unit 13 mounted on trailer tongue 38. At this time the trailer tongue will be supported by the conventional screw jack 56 so as to be at the proper level. Pickup truck 16 may then be backed up until ball 27 enters socket 55 and is locked in position. Screw jack 56 may then be raised and the forward end of the trailer will be supported at the connection between ball 27 and socket 55. The trailer may thus be towed without the disadvantages of the conventional hitching arrangement. The length of upper horizontal section 31 of the connecting unit is such that tailgate 57 of the truck may be opened, and truck 16 may be turned at any angle with respect to trailer 39 without connecting unit 13 touching the tailgate or the truck body. The entire area of the truck bed is still available for use and may be covered if desired. If a cover is placed on the truck body, the only projecting items would be ball 27 and an electrical connection (not shown) for the trailer.

An important advantage of the present invention is the fact that it enables the owner of a pickup truck and a recreational vehicle to connect them in an advantageous manner merely by bolting two units to the truck and trailer respectively, without the necessity of welding or other complex attachment methods, or the need for altering the frames or any other parts on either vehicle.

What is claimed is:

1. A trailer hitch adapted for connecting the conventional V-shaped tongue of a trailer having a socket at its forward end to a pickup truck, comprising a truck unit mountable on the body of the pickup truck so as to leave substantially the entire body volume available for cargo, said truck unit carrying a ball approximately above the rear axle and approximately at the level of said body top, said truck unit comprising a substantially rectangular frame adapted to overlie the free upper edges of the side walls of the pickup truck body and including intermediate cross member means for mounting said hitch ball, all portions of said cross member means being above the body volume, and a connecting unit having a lower horizontal section securable to said trailer tongue, a section extending upwardly from the forward end of said lower horizontal section, and an upper horizontal section extending forwardly from the upper end of said upwardly extending section and carrying a socket engageable with said truck unit ball, said upper horizontal section being above said body top level and of sufficient length to permit said truck to be turned at any angle with respect to said trailer without said connecting unit touching said truck body.

2. The combination according to claim 1, said truck unit frame comprising longitudinal and cross members extending around the periphery of the pickup truck body, all portions of said members being above the body volume.

3. The combination according to claim 2, said truck unit ball being carried by a plate supported by cross members on the truck unit.

4. The combination according to claim 1, further provided with means for securing the lower horizontal section of said connecting unit immediately beneath said trailer tongue comprising bolts connecting intermediate portions of the arms of the tongue to a rear portion of said lower horizontal section disposed beneath said tongue and a ball carried by a forward portion of said lower horizontal section beneath said tongue engageable with the socket of said tongue.

5. The combination according to claim 4, said bolts being U-shaped.

6. The combination according to claim 1, further provided with vertically adjustable mounting means between said upper horizontal connecting unit section and said socket, whereby the height of said socket may be adjusted for various sizes of pickup trucks.

7. The combination according to claim 6, said vertical adjusting means comprising a first vertical plate carried by said upper horizontal section and a second vertical plate overlapping said first plate and carrying said socket, the first plate having a plurality of vertically spaced fastener apertures.

8. In a trailer hitch adapter for connecting a conventional recreational trailer having a V-shaped tongue with a socket to a pickup truck so that the hitch will be approximately over the rear truck axle, a truck unit having longitudinal and cross members mounted on the upper edge of the truck body, a ball carried by an intermediate portion of said truck unit, said truck unit comprising a substantially rectangular frame adapted to overlie the free upper edges of the side walls of the pick-up truck body and including intermediate cross member means for mounting said hitch ball, all portions of said cross member means being above the body volume, a connecting unit having a lower horizontal section disposed immediately beneath said V-shaped tongue, a vertical section extending upwardly from the forward end of said lower horizontal section and an upper horizontal section extending forwardly from the upper end of the vertical section above the pickup truck body top and sufficiently long to permit full turning of the truck with respect to the trailer, all three of said sections being rigidly interconnected to form an integral unit, a ball carried by the forward end of the lower horizontal section and engageable with the tongue socket, whereby truck pulling forces will be applied directly to said tongue socket, a rear cross member on the lower horizontal section, bolts securing said cross member to the underside of said tongue whereby the connecting unit is securely fastened to the trailer, and a vertically adjustable socket carried by the forward end of said upper horizontal section and engageable with the ball carried by the truck unit.

* * * * *